United States Patent [19]

Haas et al.

[11] Patent Number: 4,758,601

[45] Date of Patent: Jul. 19, 1988

[54] PROCESS FOR THE PRODUCTION OF POLYSILOXANE IONOMERS, POLYSILOXANE IONOMERS AND THEIR USE FOR THE PRODUCTION OF CELLULAR POLYURETHANE ELASTOMERS

[75] Inventors: Peter Haas, Haan; Hans-Dieter Ruprecht, Cologne; Paul T. Henrichs, Bergisch Gladbach, all of Fed. Rep. of Germany

[73] Assignee: Bayer Aktiengesellschaft, Bayerwerk, Fed. Rep. of Germany

[21] Appl. No.: 57,472

[22] Filed: Jun. 3, 1987

[30] Foreign Application Priority Data

Jun. 24, 1986 [DE] Fed. Rep. of Germany ....... 3621040

[51] Int. Cl.$^4$ ............................................. C08G 18/14
[52] U.S. Cl. ..................................... 521/108; 521/110; 521/111; 521/159; 521/163; 521/170
[58] Field of Search ............... 521/108, 110, 111, 159, 521/163, 170

[56] References Cited

U.S. PATENT DOCUMENTS 3,993,606  11/1976  von Bonin et al. .................. 260/2.5
4,350,777   9/1982  Henrichs et al. .................... 521/110

FOREIGN PATENT DOCUMENTS 1044629  10/1966  United Kingdom .
1056066   1/1967  United Kingdom .
1128642   9/1968  United Kingdom .

*Primary Examiner*—Maurice J. Welsh
*Attorney, Agent, or Firm*—Gene Harsh; Joseph C. Gil; Thomas W. Roy

[57] ABSTRACT

The present invention is directed to a process for the production of waterproof, fine-cell polyurethane elastomers having a density of about 300 to 800 kg/m$^3$ by reacting (a) organic polyisocyanates,
(b) polyhydroxyl compounds having a molecular weight of about 400 to about 8000,
(c) water and, optionally,
(d) organic chain-extending agents containing at least two isocyanate-reactive hydrogen atoms and having a molecular weight of 32 to 399, the equivalent ratio of isocyanate groups to NCO-reactive groups in the overall formulation being about 0.90:1 to 1.20:1, characterized in that polysiloxane ionomers are added to the water/crosslinker component in concentrations of about 0.1 to 5% by weight, based on the reaction mixture as a whole.

9 Claims, No Drawings

PROCESS FOR THE PRODUCTION OF POLYSILOXANE IONOMERS, POLYSILOXANE IONOMERS AND THEIR USE FOR THE PRODUCTION OF CELLULAR POLYURETHANE ELASTOMERS

BACKGROUND OF THE INVENTION

1. Field of the Invention

This invention relates to a process for the production of waterproof, cellular polyurethane elastomers suitable for use as cushion or spring elements by the co-use of aqueous polysiloxane ionomers in the water crosslinker component.

2. Description of the Prior Art

Moldings of cellular polyurethane elastomers are industrially produced from polyisocyanates, polyhydroxyl compounds of relatively high molecular weight, water as chain extending agent and blowing agent and, optionally, additional chain-extending agents. Cellular polyurethane elastomers are distinguished from polyurethane foams by considerably higher unit weights (approximately 300 to 800 kg/m³), better physical properties and their potential applications.

Particularly high-quality cellular polyurethane elastomers such as a product obtained from 1,5-naphthylene diisocyanate, a linear polyadipate glycol (molecular weight approximately 2000) and water, are industrially used inter alia as suspension elements, cushions and deadening materials.

A major application is in the automotive industry where materials of the type in question are primarily used as springs and stop buffers. It is of advantage, particularly in the case of strut constructions in motor vehicles, to replace the additional springs previously made of rubber by springs of cellular polyurethane elastomers because cellular polyurethane elastomers are distinguished from compact elastic materials by considerably greater deformability. Deformations of up to 80% are quite normal in practice, particularly in the case of automobile shock absorbers.

In automobiles, suspension elements made of cellular polyurethane elastomers are pushed onto the piston rod of the shock absorber within the overall strut construction consisting of shock absorber, helical spring and the elastomer spring. In this type of arrangement, water, substances dissolved therein and particles of dirt are in danger of entering the more or less open cell structure of the elastomeric material. Apart from temperature effects, particularly in the vicinity of freezing point, this gives rise to corrosion and wear. The impermeability of materials such as these to water is of considerable importance to their long-term serviceability.

It was disclosed in DE-A No. 3,029,272/EP-B No. 36,994 that water uptake could be significantly reduced by siloxanes or siloxane-urethane-ureas. In this process, the siloxane component is generally added to the prepolymer stage, while on the (water-containing) crosslinker side, an emulsifier has to be additionally used to ensure intensive dispersion of the water in the hydrophobic prepolymer.

The salts of fatty acids, of higher molecular weight sulfonates or sulfonated fatty acid esters, for example, those of castor oil are normally used as emulsifiers.

However, these compounds alone are not sufficient to prevent water from being taken up into the cellular structure of the elastomer. Although water uptake is distinctly reduced with the above-mentioned siloxanes, a further reduction is nevertheless desirable in light of previous experience when materials of the type in question have been used in the automotive industry. Another disadvantage of the known process lies in the fct that another component has to be added to the sensitive NCO-prepolymer side.

It has now surprisingly been found that the water uptake of cellular elastomers under alternating stress can be considerably reduced by siloxanes containing ionic groups (siloxane ionomers) which may be added to the water crosslinker component rather than to the NCO-prepolymer in the production of the elastomers.

SUMMARY OF THE INVENTION

The present invention is directed to a process for the production of waterproof, fine-cell polyurethane elastomers having a density of about 300 to 800 kg/m³ by reacting (a) organic polyisocyanates,
(b) polyhydroxyl compounds having a molecular weight of about 400 to about 8000,
(c) water and, optionally,
(d) organic chain-extending agents containing at least two isocyanate-reactive hydrogen atoms and having a molecular weight of 32 to 399, the equivalent ratio of isocyanate groups to NCO-reactive groups in the overall formulation being about 0.90:1 to 1.20:1, characterized in that polysiloxane ionomers are added to the water/crosslinker component in concentrations of about 0.1 to 5% by weight, based on the reaction mixture as a whole.

DETAILED DESCRIPTION OF THE INVENTION

In accordance with the present invention the polysiloxane ionomers are prepared by forming NCO-prepolymers by reacting (A) polysiloxanes containing at least 2 isocyanate-reactive groups corresponding to the formula

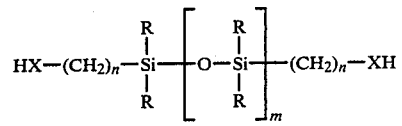

wherein

R may be the same or different and represents $C_1$–$C_5$ alkyl, $C_6$–$C_{15}$ aryl or siloxyl radicals, preferably methyl and/or phenyl radicals;
n is an integer from 1 to 10, preferably 1 to 3;
X represents oxygen or $NR^1$;
$R^1$ is hydrogen, a $C_1$–$C_6$ alkyl or $C_6$–$C_{15}$ aryl radical; and
m is an integer from about 1 to 500, preferably about 1 to 250 and most preferably about 5 to 250;

with (B) organic polyisocyanates at an equivalent ratio of the reactive XH-groups of the siloxane to isocyanate groups of about 1:1.05 to 1:2.

The NCO-prepolymers are reacted either as such or in solvents, preferably inert polar solvents, with (C) low molecular weight compounds containing one or two NCO-reactive groups, preferably a primary or secondary cycloaliphatically or aliphatically bound amino group and at least one salt group or salt-forming group, preferably a carboxyl group, a group of the acids of sulfur or phosphorus (for example, a sulfonic acid, sulfinic acid, phosphoric acid or phosphorus acid group) or salts thereof (preferably alkali salts or alkaline-earth salts), in substantially equivalent quantities and the salt-forming groups, if present, are converted into salt groups.

The low molecular weight compounds are preferably in the form of aqueous solutions, although water may be added after formation of the polysiloxane ionomers and either before or after removal of the solvents.

The following compounds for example may be used as the reactive polysiloxanes (A) containing at least two NCO-reactive groups:

isocyanates, preferably those corresponding to the formula

wherein n' equals 2 to 4, preferably 2 and

Q is an aliphatic hydrocarbon radical containing 2 to 18, preferably 6 to 10 carbon atoms; a cycloaliphatic hydrocarbon radical containing 4 to 15, preferably 5 to 10 carbon atoms; an aromatic hydrocarbon radical containing 6 to 15, preferably 6 to 13 carbon atoms; or an araliphatic hydrocarbon

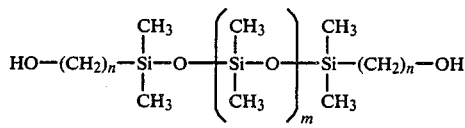

m = 1 to 250
n = 1 to 10

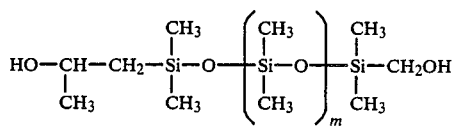

m = 1 to 250

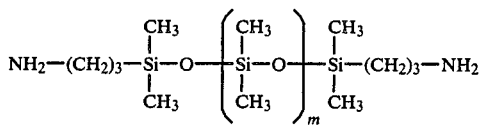

m = 1 to 250

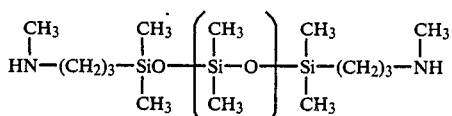

m = 1 to 250

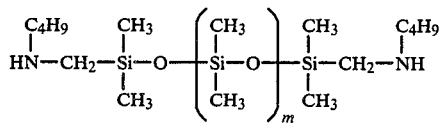

m = 1 to 250

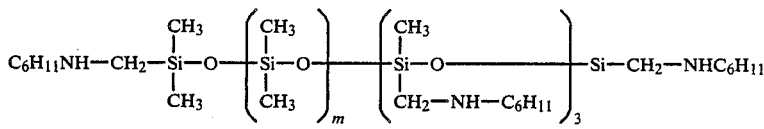

m = 1 to 250

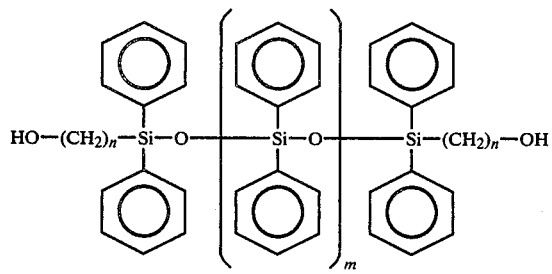

m = 1 to 250
n = 1 to 10.

A preferred polysiloxane is

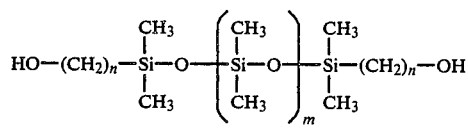

m = 1 to 250
n = 1 to 6.

(B) Suitable organic polyisocyanates include the aliphatic, cycloaliphatic, aromatic or heterocyclic polyradical containing 8 to 15, preferably 8 to 13 carbon atoms. The aliphatic and/or cycloaliphatic di- and/or polyisocyanates are especially preferred.

Examples of preferred polyisocyanates include aliphatic diisocyanates such as 1,4-tetramethylene diisocyanate, 1,6-hexamethylene diisocyanate, 1,12-dodecane diisocyanate; and cycloaliphatic diisocyanates in the form of mixtures of their stereo isomers such as cyclobutane-1,3-diisocyanate, cyclohexane-1,3- and -1,4-diisocyanate, 1-isocyanato-3,3,5-trimethyl-5-isocyanatomethylcyclo hexane (isophorone diisocyanate), 2,4- and 2,6-hexahydrotoluylene diisocyanate, hexahydro-1,3- and/or -1,4-phenylene diisocyanate, and perhydro-2,4'- and/or -4,4'-diphenylmethane diisocyanate. Examples of the less preferred aromatic diisocyanates include 1,3- and 1,4-phenylene diisocyanate, 2,4- and 2,6-toluylene diisocyanate and mixtures of these isomers, diphenylmethane-2,4'- and/or -4,4'-diisocyanate (including alkyl- and chlorine-substituted derivatives thereof) and naphthylene-1,5-diisocyanate.

Further polyisocyanates are mentioned for example, in DE-AS No. 3,029,272 (U.S. Pat. No. 4,350,777, herein incorporated by reference in its entirety) as polyisocyanates for the production of elastomers. It is also possible to use mixtures of the above-mentioned polyisocyanates. Cycloaliphatic and aliphatic diisocyanates are most preferred.

The resulting NCO-prepolymers based on the reactive siloxanes are preferably dissolved in inert solvents and reacted with salts which are preferably in the form of aqueous solutions. Examples include

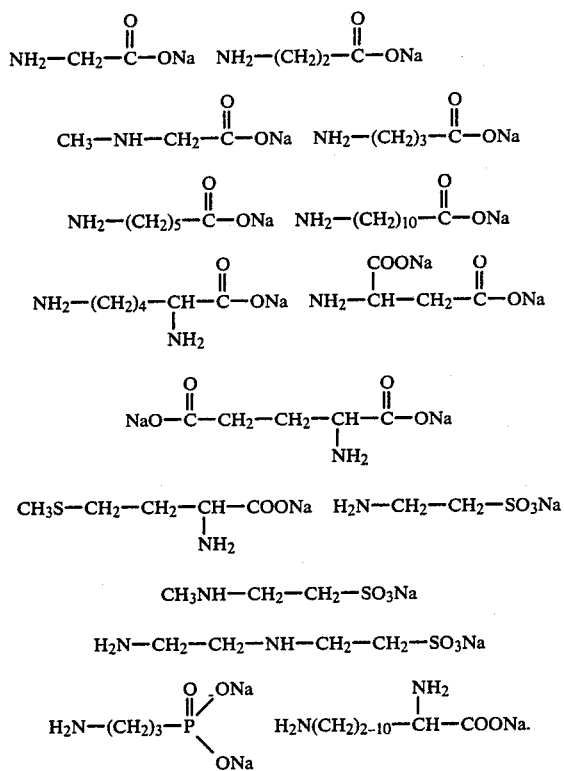

The quantities of the components are chosen to provide essentially equivalent amounts of isocyanate groups and isocyanate-reactive groups. After the reaction, the inert solvent is distilled off and water is added so that the siloxane compounds modified by ionic groups are present in aqueous solution or dispersion and may be used thus for the production of the cellular polyurethane elastomers. It is also possible first to add the water and then to distill off the solvent.

The polysiloxane ionomers containing urethane and/or urea groups are used in the production of cellular polyurethane elastomers by adding them to the water crosslinker component. The polysiloxane ionomers are used in the form of an aqueous solution or dispersion. For technical reasons, they are preferably mixed with relatively high molecular weight polyols, preferably the polyols set forth hereinafter used for the preparation of the NCO-prepolymers from components (a) and (b), in quantities of about 5 to 20% by weight, based on the total polyols used to prepare the polyurethanes, in order to achieve more favorable proportioning of the water crosslinker component.

The NCO-prepolymers used in the preparation of the cellular polyurethane elastomers having densities of about 300 to 800 kg/m$^3$ are known and based on the starting materials of the type described in detail, for example, in DE-A No. 2,920,502 (U.S. Pat. No. 4,280,007, herein incorporated by reference in its entirety) and in DE-A No. 3,029,272 (U.S. Pat. No. 4,350,777).

The NCO-prepolymers are synthesized from relatively high molecular weight polyhydroxyl compounds (b) which preferably contain about 2 to 3, preferably about 2 NCO-reactive groups, and which have a molecular weight of 400 to about 8000, preferably about 800 to 6000. Examples of these compounds include polyesters, polyethers, polythioethers, polyacetals, polycarbonates and polyester amides known for the production of homogeneous and cellular polyurethanes.

Compounds such as these are described in detail, for example, in DE-A Nos. 2,550,796, 2,550,797, 2,624,527, 2,638,759, 2,302,564 (U.S. Pat. No. 3,963,679, herein incorporated by reference), 2,402,840 (U.S. Pat. No. 3,984,607, herein incorporated by reference), 2,457,387 (U.S. Pat. No. 4,035,213, herein incorporated by reference), 2,829,670, 2,830,949 and 2,830,953. According to the invention, it is preferred to use polyesters based on adipic acid and aliphatic diols or diol mixtures (such as ethylene glycol, 1,4-butanediol, 1,6-hexanediol or neopentyl glycol), although polyethers based on polyoxytetramethylene diols are also suitable, as are polycaprolactones and polycarbonates and also (less preferably) polypropylene glycols.

Any of the polyisocyanates used in the production of PU elastomers or mixtures thereof may be used as the polyisocyanates (a). However, it is preferred to use aromatic diisocyanates such as 1,3- and 1,4-phenylene diisocyanate, 2,4- and 2,6-toluylene diisocyanate and mixtures of these isomers, diphenylmethane-2,4'- and/or 4,4'-diisocyanate, diphenylethane-4,4'-diisocyanate (including alkyl- and chlorine-substituted derivatives thereof), and especially naphthylene-1,5-diisocyanate or 3,3'-dimethyldiphenyl-4,4'-diisocyanate, N,N'-bis-(4-methyl-3-isocyanatophenyl)-urea or also cyclohexane-1,4-diisocyanate. Naphthylene-1,5-diisocyanate is particularly preferred.

The cellular polyurethane elastomer moldings are preferably produced using the known prepolymer process, i.e. a prepolymer containing isocyanate groups is prepared from the relatively high molecular weight polyol and the diisocyanate at an NCO:OH equivalent ratio of about 1.5:1 to 4:1, preferably about 1.8:1 to 3.0:1, and is reacted with water in the quantity disclosed hereinafter. It is also possible, although by no means preferred, to use the known one-shot process. Where organic chain-extending agents are co-used, they are employed in the quantities normally used in the production of polyurethane elastomers or in only small quantities as described hereinafter for the aromatic diamines. The NCO-prepolymer has an NCO-content of about 1.8 to 8.9%, preferably about 2.8 to 6.4%.

The optional chain extending agents include compounds containing hydroxyl groups, amino groups, thiol groups, and/or carboxyl groups, preferably compounds containing hydroxyl groups, of the type known as chain-extending agents or crosslinking agents and described in the publications cited above. These compounds generally contain 2 to 4, preferably 2 to 3 isocyanate-reactive groups.

Ethylene glycol, propylene glycol, trimethylene glycol, 1,4- and 2,3-butanediol, 1,6-hexanediol, neopentyl glycol, diethylene glycol, dipropylene glycol, diethanolamine, triethanolamine, dipropanolamine and N-methyldiethanolamine are mentioned as examples of compounds containing hydroxyl groups. Other polyols having a molecular weight of 62 to 399, preferably 62 to about 250 may be used.

particularly advantageous results in the production of cellular polyurethane elastomers are obtained when, in accordance with DE-A No. 2,920,502, small quantities, based on the NCO-content of the NCO-prepolymers or the reaction mixture, of aromatic diamines are used in the reaction mixture of relatively high molecular weight polyols, excess polyisocyanates, water and, optionally, other low molecular weight chain extending agents. The aromatic diamines used are those having a molecular weight of 108 to 399, preferably 108 to about 250. In particular, the addition about 0.1 to 0.8% by weight, preferably about 0.15 to 0.5% by weight of aromatic diamines to the reaction mixture as a whole has a very favorable effect in terms of a uniform cell structure and improved thermal stability under load.

Compounds containing at least two isocyanate-reactive groups and having a molecular weight of from 32 to 399 may also be used in the process according to the invention.

Examples of aromatic diamines are the bis-anthranilic acid esters according to DE-OS Nos. 2,040,644 and 2,160,590; the 3,5- and 2,4-diaminobenzoic acid esters according to DE-OS No. 2,025,900; the diamines containing ester groups described in DE-OS Nos. 1,803,635 (U.S. Pat. No. 3,681,290 and 3,736,350), 2,040,650 and 2,160,589; the diamines containing ether groups according to DE-OS Nos. 1,770,525 and 1,809,172 (U.S. Pat. Nos. 3,654,364 and 3,736,295); 2-halogen-1,3-phenylene diamines optionally substituted in the 5-position (DE-OS Nos. 2,001,772, 2,025,896 and 2,065,869); 3,3'-dichloro-4,4'-diaminodiphenylmethane; 2,4- and/or 2,6-toluylenediamine and toluylenediamine substituted by one or two $C_1$-$C_3$ alkyl groups (for example, 3,5-diethyl-2,4- or -2,6-diaminotoluene); 4,4'-diaminodiphenylmethane and 2,4'-diaminodiphenylmethane and derivatives thereof substituted by 1 to 4 $C_1$-$C_4$ alkyl groups and/or 1 to 4 chlorine atoms (for example, 3,3'-dimethyl-4,4'-diaminodiphenylmethane, 3,3,5,5'-tetraethyl-4,4'-diaminodiphenylmethane, 3,3',5,5'-tetraethyl-2,2'-dichloro-4,4'-diaminodiphenylmethane, 3,3'-diisopropyl-4,4'-diaminodiphenylmethane, etc); 4,4'-diaminodiphenyldisulfides (DE-OS No. 2,404,976); diaminodiphenyldithioethers (DE-OS No. 2,509,404); and aromatic diamines substituted by alkylthio groups (DE-OS No. 2,638,760). The diamines preferably used are those which are analogous in their structure to the diisocyanate used. Thus, toluylenediamine and substituted toluylenediamines are preferably used for the reaction with 2,4- and 2,6-toluylene diisocyanate, while prepolymers based on 4,4'-diisocyanatodiphenylmethane are preferably reacted with—optionally substituted—diaminodiphenylmethanes. Naphthylene-1,5-diisocyanate is advantageously combined with 1,5-diaminonaphthylene, although the combination of 1,5-diaminonaphthylene with 4,4'-diisocyanatodiphenylmethane also gives valuable products. It is surprising that even very small quantities of the diamine, preferably about 0.15 to 0.5% by weight, based on the polyurethane as a whole, are active in the context of the invention.

It is preferred to use 4,4'-diaminodiphenylmethane and its methyl- and chlorine-substitution products, optionally in admixture with 2,4'-diaminodiphenylmethane; 2,4- and/or 2,6-toluylenediamines; and, in particular, 1,5-diaminonaphthalene.

The combination of 1,5-naphthylene diisocyanate with 1,5-diaminonaphthylene is particularly preferred. Preferably, the diprimary diamine is added to the reaction mixture in the form of a solution in that part of the relatively high molecular weight polyhydroxy compound and the polysiloxane-ionomer solution according to the invention which is used in the second process step. In this connection, it is advantageous as far as the process is concerned to add a small quantity of the aromatic diisocyanate used to this diamine solution in a separate process step using molar ratio of diamine to diisocyanate of about 2:1 to 10:9. By virtue of the substantially selective reaction between NCO and $NH_2$ groups in the polyol, amine ureas corresponding to the general formula

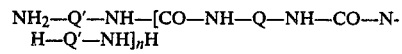

in which
n is an integer of from 1 to 11,
Q is the residue left after removal of the NCO groups from the diisocyanate and
Q' is the residue left after removal of the amino groups from the diamine,
are formed in situ in a quantity of about 0.2 to 1% by weight, based on the polyurethane.

In the process according to the invention, water is used both as chain-extending agent and as blowing agent. However, the chain-extending agents mentioned by way of example may be used in addition to water. The water is generally used in a quantity of about 0.5 to 5% by weight, preferably in a quantity of about 0.7 to 1.5% by weight, based on the mixture of reactants as a whole. The water is preferably used in the form of an aqueous solution of the polysiloxane ionomer according to the invention. This ensures that the water is thoroughly mixed (emulsifying effect) with the other reactants and, at the same time, provides for the hydrophobicizing effect in the cellular elastomer.

The polyurethane elastomers are prepared using the individual reactants in such quantities that an isocyanate index of about 100 to 115 is obtained. This applied both to the preferred reaction of NCO-prepolymers with water and also to the quantitative ratios between the individual reactants in the less preferred one-shot process.

The quantity in which the reaction mixture is introduced into the mold is gauged in such a way that the above-mentioned unit weight of about 300 to 800 kg/m³ is obtained. The reaction mixtures may be prepared and the molds filled using machines, for example of the type described in U.S. Pat. No. 2,764,565. Detailed information on processing machines which may also be used in accordance with the invention can be found in Kunststoff-Handbuch, Vol. VII, edited by Vieweg and Hochtlen, Carl Hanser Verlag, Munich 1966, for example on pages 121 to 205.

Suitable mold materials are metals such as aluminum and plastics such as epoxy resins. The foamable reaction mixture foams in the mold and the molded product conforms to the mold.

The effect of these polysiloxane ionomers in elastomers having a cellular structure may be regarded as surprising. When these products are used as cell stabilizers in elastomeric polyester urethane foams, for example in a flexible and elastomeric polyester foam according to Becker/Braun, Kunststoff-Handbuch, Vol. 7, Carl-Hanser-Verlag Munchen 1983, page 194, based on a slightly branched polyester polyol of adipic acid, diethylene glycol and trimethylolpropane having an OH number of 60, the formation of a foamable mixture is completely suppressed. Instead, a brittle mass having a coarse cell structure and minimal height is obtained.

The invention is further illustrated, but is not intended to be limited by the following examples in which all parts and percentages are by weight unless otherwise specified.

EXAMPLES (I) Preparation of the polysiloxane ionomers containing ionic groups (a) Preparation of an NCO-prepolymer based on reactive silicone compounds 570 g α,ω-hydroxymethyl polydimethyl siloxane having an OH content of 6% were added to 444 g isophorone diisocyanate, followed by the addition of 500 g anhydrous acetone at an NCO content of 8.3%.

EXAMPLE 1

A solution of 194 g of the sodium salt of aminoacetic acid in 194 g water was added to prepolymer (a); the temperature rose to 52° C. After 1 hour, no more isocyanate groups could be detected. Removal of the acetone resulted in a colorless resin which was diluted with 1014 g water to form a 50% solution of opaque appearance.

EXAMPLE 2

A solution of 306 g of the sodium salt of 6-aminocaproic acid in 306 g water was added to prepolymer (a). After about 1 hour, no more isocyanate groups could be detected in the cloudy dispersion. 1014 g water were added and acetone was distilled off, leaving a 50% dispersion of the polysiloxane urea carboxylate.

EXAMPLE 3

A solution of 382 g of the disodium salt of glutamic acid and 382 g water was added to prepolymer (a). After about 2 hours, no more isocyanate groups could be detected. 1014 g water were added and acetone was distilled off, leaving a 50% dispersion of the polysiloxane urea carboxylate.

EXAMPLE 4

A solution of 250 g of the sodium salt of 2-aminoethane sulfonic acid and 250 g water was added to prepolymer (a). After about 1 hour, no more isocyanate groups could be detected. 1014 g water were added and acetone was distilled off, leaving a 50% dispersion of the polysiloxane urea sulfonate.

NCO-prepolymer (b)

2280 g α,ω-dihydroxymethyl polydimethyl siloxane having an OH content of 3% were added to 666 g isophorone diisocyanate, followed by the addition of 2950 g anhydrous acetone at an NCO content of 2.85%.

EXAMPLE 5

A solution of 194 g of the sodium salt of aminoacetic acid in 194 g water was added to the prepolymer solution of (b). After 2 hours, no more isocyanate groups could be detected. 2946 g water were added and a 50% dispersion of the polysiloxane urea carboxylate was obtained after acetone had been distilled off.

EXAMPLE 6

A solution of 354 g of the disodium salt of amino-succinic acid in 354 g water was added to the prepolymer solution of (b). After about 1 hour, no more isocyanate groups could be detected. 2946 g water were added and a 50% dispersion of the polysiloxane urea carboxylate was obtained by distilling off acetone.

(II) Production of the cellular elastomer moldings

EXAMPLE 7

(comparison Example)

24 parts 1,5-naphthylene diisocyanate were added at 130° C. to 90 parts of a dihydroxy butanediol/ethanediol (1:1)-adipic acid mixed polyester having an OH number of 56, followed by stirring for 15 minutes until an NCO content of approximately 5% was reached. The NCO-prepolymer was then cooled to 90° C.

A mixture of 10 parts of the mixed polyester (heated to 50° C.) of the same composition as used for the NCO-prepolymer and 2.15 parts of a 50% aqueous solution of the sodium salt of sulfonated castor oil as emulsifier was prepared as the crosslinker component.

To fill the mold with foam, both the NCO-prepolymer component and aqueous crosslinker component were separately metered via casting machines with gear pumps and a stirrer-equipped mixing head and introduced into the (buffer) mold at a mold temperature of 80° C. After about 30 minutes, the moldings were removed and heated for 12 hours at 110° C. They have a gross density of 470 kg/m$^3$ (buffer height 155.5 mm, buffer weight 100.0 g).

Testing of the spring elements:

The elastomer molding was compressed under water to 65% of its original length, left in that state for 1 hour, subsequently expanded under water and then stored in water for 30 hours, removed, briefly dabbed and weighed.

Drying was carried out at 50° C. to constant weight; duration about 1 week.

Dynamic loading:

The test specimen was deformed by 65% of its original height at a frequency of 2 Hz for a total of 400,000 load changes. The water uptake was then redetermined:
Water uptake (average value from 8 measurements) in (Comparison) Example 7=94 g
Water uptake after dynamic testing in (Comparison) Example 7 (average value)=99.9 g.

EXAMPLE 8

(according to the invention)

Note

Whereas the use of the polysiloxanes or polysiloxane urethanes and polysiloxane ureas described in DE-A No. 3,029,272 result in a considerable reduction in the water uptake of the elastomers, these products had to be added to the sensitive NCO-prepolymer stage which can adversely affect inter alia the stability in storage and reactivity of the NCO-prepolymer stage.

Compared with the earlier laboratory test conditions (as applied in DE-A No. 3,029,272), which in many cases could not be fully confirmed by practical experience, the test conditions were now made considerably more stringent with regard to time and deformation conditions in order to obtain good correlation with the practical longtime behavior of the test specimens.

The polysiloxane carboxylates according to the invention as well as the corresponding sulfonates and phosphates are now added on the water side, i.e. to the water crosslinker component, and accordingly, leave the prepolymer side unaffected during its synthesis and storage.

Procedure:

The procedure was the same as in Example 7, except that instead of the sodium salt of sulfonated castor oil used in the Example 7 the 50% aqueous siloxane ionomer solution of Example 1 was mixed with 10 parts of the mixed polyester set forth in Example 7 and used as water crosslinker component.

Buffer height: 155.5 mm; buffer weight: 100.0 g
Water uptake (average value from 8 measurements)=6.6 g
Water uptake after dynamic testing=16.1 g.

EXAMPLE 9

(according to the invention)

The procedure was the same as in Example 7, except that instead of the sodium salt of sulfonated castor oil, the 50% aqueous solution of Example 2 was mixed with 10 parts of the polyester polyol and used as water crosslinker component.

Buffer height: 155.5 mm; buffer weight: 100 g
Water uptake (average value from 8 measurements)=6.6 g
Water uptake after dynamic testing=18.2 g.

EXAMPLE 10

(according to the invention)

The procedure was the same as in Example 7, except that instead of the sodium salt of sulfonated castor oil, the 50% aqueous solution of Example 5 was mixed with 10 parts of the polyester polyol and used as water crosslinker component.

Buffer height: 155.5 mm; buffer weight: 100 g
Water uptake (average value from 8 measurements)=6.0 g
Water uptake after dynamic testing=17.7 g.

In the reaction to form cellular elastomers, the polysiloxane ionomers according to the invention have
an emulsifying effect,
a stabilizing effect on the cell strucure and
reduce water uptake in the moldings to a surprisingly high degree.

Even after dynamic testing, the decidedly low water uptake remains at a low level, i.e. the cell structure is not significantly altered by the loading process and remains closed without losing any of its oustanding damping properties.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of a waterproof, fine-cell polyurethane elastomer having a density of about 300 to 800 kg/m$^3$, which comprises reacting
   (a) an organic polyisocyanate,
   (b) a polyhydroxyl compound having a molecular weight of 400 to about 8000,
   (c) water and, optionally,
   (d) an organic chain extending agent containing at least 2 isocyanate-reactive groups and having a molecular weight of 32 to 399 at an equivalent ratio of isocyanate groups to isocyanate-reactive groups of about 0.90:1 to 1.20:1, wherein a polysiloxane ionomer is added to the water/optional chain extending agent component in an amount of about 0.01 to 5% by weight, based on the reaction mixture as a whole, said polysiloxane ionomer being prepared by a process which comprises forming an NCO-prepolymer by reacting
   (A) a polysiloxane containing at least two isocyanate-reactive groups corresponding to the formula

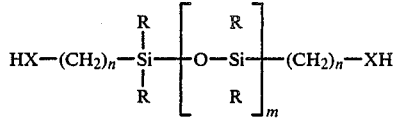

wherein
R may be the same or different and represents a $C_1$-$C_5$ alkyl radical, a $C_6$-$C_{15}$ aryl radical or a siloxyl radical,
n is an integer from 1 to 10,
X represents oxygen or $NR^1$,
$R^1$ is hydrogen, a $C_1$-$C_6$ alkyl radical or a $C_6$-$C_{15}$ aryl radical and
m is an integer from about 1 to 500, with
   (B) an organic polyisocyanate, at an equivalent ratio of the reactive XH-groups of the siloxane to isocyanate groups of about 1:1.05 to 1:2, and subsequently reacting the NCO-prepolymer with
   (C) substantially equivalent quantities of an aqueous solution of a low molecular weight compound containing 1 or 2 NCO-reactive groups and at least one salt group or salt-forming group and converting the salt-forming group, if present, into a salt.

2. The process of claim 1 wherein said organic chain extending agent comprises about 0.1 to 0.8%, based on the reaction mixture as a whole, of an aromatic diamine having a molecular weight of 108 to 399.

3. The process of claim 1 wherein component (A) comprises a member selected from the group consisting of

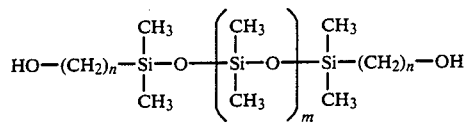

m = 1 to 250
n = 1 to 10

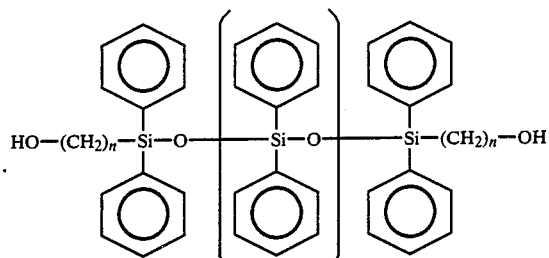

m = 1 to 250
n = 1 to 10

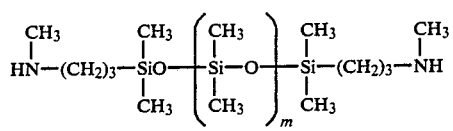

m = 1 to 250

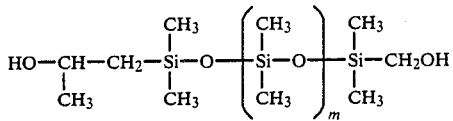

m = 1 to 250

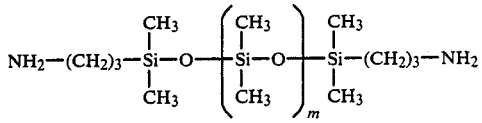

m = 1 to 250

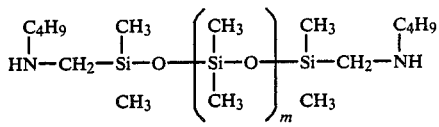

m = 1 to 250 and

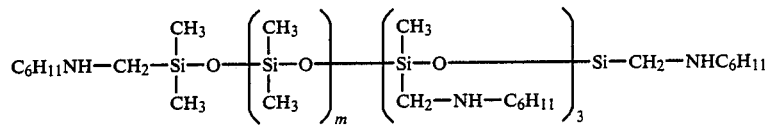

m = 1 to 250.

4. The process of claim 1 wherein said low molecular weight compound comprises a member selected from the group consisting of

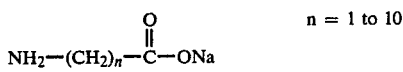  n = 1 to 10

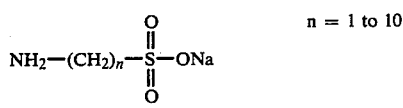  n = 1 to 10

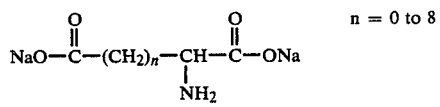  n = 0 to 8

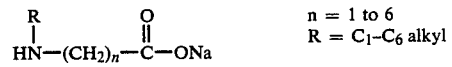  n = 1 to 6; R = C$_1$–C$_6$ alkyl

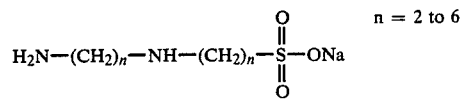  n = 2 to 6

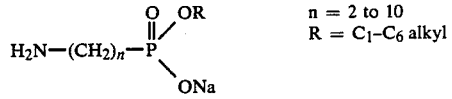  n = 2 to 10; R = C$_1$–C$_6$ alkyl

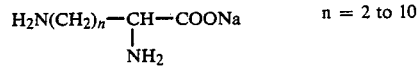  n = 2 to 10

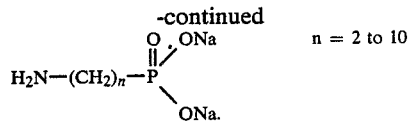  n = 2 to 10

5. The process of claim 1 wherein said organic polyisocyanate comprises a member selected from the group consisting of 1,5-naphthalene diisocyanate, 4,4'-diphenylmethane diisocyanate, 4,4'-diphenylethane diisocyanate, 1,4-phenylene diisocyanate, 1,4-cyclohexane diisocyanate and 3,3'-dimethyl-4,4'-diisocyanatodiphenyl.

6. The process of claim 1 wherein said polyhydroxyl compound (b) comprises a member selected from the group consisting of polyester polyols, polypropylene glycols, polyoxytetramethylene ether diols, polycaprolactone diols and polycarbonate diols having a molecular weight of about 800 to 4000.

7. The process of claim 1 wherein said organic polyisocyanate is reacted with a portion of said polyhydroxyl compound to form an NCO-prepolymer which is subsequently reacted with a mixture containing the remainder of said polyhydroxyl compound, water, said polysiloxane ionomer and optionally said chain extender.

8. The process of claim 1 wherein
R may be the same or different and represents a methyl and/or a phenyl radical,
n is an integer from 1 to 3 and
m is an integer from about 1 to 250.

9. The process of claim 8 wherein said low molecular weight compound comprises a member selected from the group consisting of
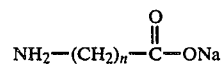  n = 1 to 10
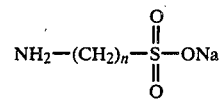  n = 1 to 10
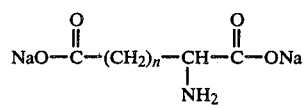  n = 0 to 8
-continued
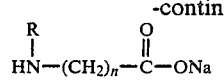  n = 1 to 6
R = $C_1$–$C_6$ alkyl
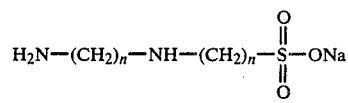  n = 2 to 6
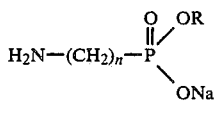  n = 2 to 10
R = $C_1$–$C_6$ alkyl
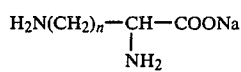  n = 2 to 10
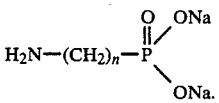  n = 2 to 10.
* * * * *